(12) United States Patent
De Oliveira

(10) Patent No.: US 10,960,834 B2
(45) Date of Patent: Mar. 30, 2021

(54) HYBRID POWER DISTRIBUTION CENTRAL UNIT FOR VEHICLES

(71) Applicant: FCA FIAT CHRYSLER AUTOMOVEIS BRASIL LTDA., Betim (BR)

(72) Inventor: José Willian De Oliveira, Belo Horizonte (BR)

(73) Assignee: FCA FIAT CHRYSLER AUTOMOVEIS BRASIL LTDA., Betim (BR)

(*) Notice: Subject to any disclaimer, the term of this patent is extended or adjusted under 35 U.S.C. 154(b) by 125 days.

(21) Appl. No.: 16/321,678

(22) PCT Filed: Aug. 1, 2017

(86) PCT No.: PCT/BR2017/050216
§ 371 (c)(1),
(2) Date: Jan. 29, 2019

(87) PCT Pub. No.: WO2018/023185
PCT Pub. Date: Feb. 8, 2018

(65) Prior Publication Data
US 2020/0148138 A1    May 14, 2020

(30) Foreign Application Priority Data

Aug. 2, 2016 (BR) ...................... 10 2016 017915-7
Jul. 27, 2017 (BR) ...................... 10 2017 016090-4

(51) Int. Cl.
*H01H 85/20* (2006.01)
*B60R 16/03* (2006.01)
(Continued)

(52) U.S. Cl.
CPC .......... *B60R 16/03* (2013.01); *B60R 16/0238* (2013.01); *H01H 85/20* (2013.01);
(Continued)

(58) Field of Classification Search
CPC .... B60R 16/0238; B60R 16/03; H01H 85/20; H01H 85/22; H01H 2085/2075;
(Continued)

(56) References Cited

U.S. PATENT DOCUMENTS 4,318,156 A * 3/1982 Gallagher ................ H02B 1/52
307/147
4,842,534 A    6/1989 Mobley et al.
(Continued)

OTHER PUBLICATIONS

"International Application Serial No. PCT/BR2017/050216, International Search Report dated Oct. 31, 2017", (Oct. 31, 2017), 3 pgs.
(Continued)

*Primary Examiner* — Jacob R Crum
(74) *Attorney, Agent, or Firm* — Schwegman Lundberg & Woessner, P.A.

(57) ABSTRACT

A hybrid power distribution central unit (1) is described, which comprises a housing (box) (2), provided with at least one cover (3) and internally defining a plurality of seats for coupling modules (12, 13, 14) of specific types, said housing (box) (2) comprising a power supply module (11) in order to electrically feed all the functional modules (12, 13, 14) coupled to the housing (box) (2). The functional modules are interchangeable according to their dimensions and not according to their specific types, thus, being possible for the hybrid power distribution central unit (1) to simultaneously use functional modules of different types.

8 Claims, 4 Drawing Sheets

(51) Int. Cl.
*H02G 3/08* (2006.01)
*B60R 16/023* (2006.01)

(52) U.S. Cl.
CPC .......... *H02G 3/08* (2013.01); *H01H 2085/208* (2013.01); *H01H 2085/209* (2013.01); *H01H 2085/2075* (2013.01)

(58) Field of Classification Search
CPC ....... H01H 2085/208; H01H 2085/209; H02G 3/08; H05K 7/026
See application file for complete search history.

(56) References Cited

U.S. PATENT DOCUMENTS

| | | |
|---|---|---|
| 5,179,503 A | 1/1993 | Fouts et al. |
| 5,581,130 A | 12/1996 | Boucheron |
| 5,653,607 A * | 8/1997 | Saka .................... B60R 16/0238 439/402 |
| 5,928,004 A | 7/1999 | Sumida et al. |
| 7,907,423 B2 * | 3/2011 | Lopes ................. B60R 16/0238 361/822 |
| 8,681,480 B2 * | 3/2014 | Uchida ................ H01R 13/506 361/624 |
| 2001/0049211 A1 * | 12/2001 | Sumida ............... B60R 16/0238 439/76.2 |
| 2002/0009927 A1 * | 1/2002 | Berberich ........... B60R 16/0238 439/625 |
| 2007/0228826 A1 | 10/2007 | Jordan et al. |
| 2018/0326930 A1 * | 11/2018 | Fastrez ............... B60R 16/0238 |

OTHER PUBLICATIONS

"International Application Serial No. PCT/BR2017/050216, Written Opinion dated Oct. 31, 2017", (Oct. 31, 2017), 4 pgs.

* cited by examiner

HYBRID POWER DISTRIBUTION CENTRAL UNIT FOR VEHICLES

PRIORITY APPLICATIONS

This application is a U.S. National Stage Filing under 35 U.S.C. 371 from International Application No. PCT/BR2017/050216, filed on Aug. 1, 2017, and published as WO2018/023185 on Feb. 8, 2018, which claims the benefit of priority to Brazilian Application No. BR 10 2017 016090-4, filed on Jul. 27, 2017 and Brazilian Application No. BR 10 2016 017915-7, filed on Aug. 2, 2016; the benefit of priority of each of which is hereby claimed herein, and which applications and publication are hereby incorporated herein by reference in their entirety.

The present invention relates to a hybrid power distribution central unit composed of different modules and applied to a motor vehicle. More particularly, the present invention relates to a hybrid power distribution central unit device, comprising relays and fuses interconnected with control and switching elements in order to ensure a highest level of electrical protection and a least degree of the circuits' complexity.

STATE OF THE ART

As is known in the art, motor vehicles originally appeared as exclusively mechanical vehicles based on an internal combustion engine. Over the years, more and more electrical equipment and devices have been incorporated thereof to increase the functionality and drivability of the vehicles. As a result of this evolution, a true embedded electric grid appears, comprising the energy source (battery and/or alternator), electrically powered devices (headlights, sound systems, among many others), as well as a power distribution central unit (also known as fuse box), all these elements properly interconnected by a respective electrical cabling. Finally, with the incorporation of electronic devices to the vehicles, controlled by processed units (ECU, TCU, BCM, etc.), the vehicle's cabling has multiplied by incorporation of an electronic communication network to the previously existing electrical cabling. Such an evolution of the electro-electronic systems presents a time frame in the year of 1987, when the first vehicle appeared in the market whose production cost of the mechanical components is lower than the production cost of its electro-electronic systems.

As a result of this evolution, the power distribution central units also evolved to reflect the quantitative and qualitative increase of the embedded electro-electronic systems. Basically, there are three typologies for power distribution, protection and switching central units (PDC), which are still present in the current vehicles due to the wide variety of electro-electronic input still verified in the market.

The oldest solution is the so-called Hard-Wired (HW) solution. This type of technology has power units that have the function of directly connecting the electrical wire harness to the protection and switching components. In this type of solution, a base (of dielectric material) receives, on its upper face, electrical components (fuses and relays) which are embedded in respective seats, molded and coupled electrically in female connectors fixed on the seats. The electrical coupling of each of these components is made on the underside by means of direct connection of the electric cables terminals to the electrical contacts fixed on the base, while the equipotential junctions are made through internal circuits consisting of "Bus-bars" or metal bars.

The solution identified as Stamped Leadframe (SL) comprises power units that have the function of connecting the electrical wire harness to the protection and switching components through circuits with "n" metallic layers. The connection between the components and the internal circuits is achieved by using female/female terminals of various types of materials inserted in male laminated terminals originated from the folding of the appendages of the metallic stamped circuits. On the PDC-SL plastic body there are the "Headers" (counterpart of the female connector of the electrical wire harnesses) that has the function of centralizing and protecting the respective male terminals of connection with the electrical wire harnesses, also originated from the folding of the appendages of metal stamped circuits.

Finally, the solution known as the Printed Circuit Board (PCB) comprises power units that have the function of connecting the electrical wire harness with the protection and switching components through printed circuit boards made of fiberglass or phenolite. Thus, the printed circuit board is provided with several male connectors in order to receive the protection and switching components, in particular fuses and relays, among others.

Obviously, all solutions have their advantages and disadvantages, such as connection type, costs, among others. However, all solutions have in common a technological unit, that is, they are not known in the art as mixed or hybrid technology power units.

In theory, a hybrid type power unit could incorporate the best advantages of each known solution, as well as eliminate, or at least, reduce the disadvantages related to each one of said solutions.

The present invention refers to a concept of a Power Distribution Central Unit that can be adjusted through a catalog of components that, in a planned way, allows groupings modules of different types and characteristics, making this solution, in addition of hybrid and modular, expandable and flexible. More particularly, the present invention relates to the configuration of a Hybrid Power Distribution Central Unit composed of modules which allows, as far as is required, the quantity of switching elements (Relays) and protection elements (Fuses) interconnected by cables or stamped metal bars (Bus-Bars) that ensure the highest level of electrical protection and the least degree of the circuits complexity.

Concerning to the state of the art, the U.S. Pat. No. 5,179,503 discloses a modular automotive power distribution unit having a housing for mounting a plurality of interchangeable support modules. Each support module is adapted to support a specific electrical component such as an ISO relay, mini-fuse, maxi-fuse, etc., and said support modules are uniform so as to allow an interchangeable positioning in the housing for selective combination variation of electrical components. However, such a document does not anticipate a pre-fuse, from which high power circuits can be separated. The fixing of the fuses on the bus-bar is a stud mounting, but not a clipping mounting. Accordingly, the present invention features less voltage drop and consequently higher power supported compared to U.S. Pat. No. 5,179,503, both evaluated under the same conditions. In addition, the present invention has the advantage of optimizing mass and space for modularization.

The document US 20070228826 discloses embodiments of a flexible, extensible modular approach to electrical and communication system architecture in a vehicle. According to certain embodiments of US 20070228826, standardized high volume components and housings, referred to as Plug-In Modules (PIM), are used in vehicle electrical centers. The same PIMs can be used (in different quantities) on any manufactured vehicle. In addition, the PIMs feature an "L" locking system that stabilizes the modules against mechanical shocks, vibrations and noise that impair the overall performance. However, the described solution does not have pre-fuses in order to separate the high power circuits.

The U.S. Pat. No. 4,842,534 discloses a fuse/bus bar assembly for use in automotive applications described an integral bus-bar of highly conductive material, a fixed terminal mounted thereto, a discrete terminal spaced from the fixed terminal, a plug-in type fuse connecting the discrete terminal to the fixed terminal mounted on the bus-bar with the plug-in type fuse, having two blades, one blade inserted into the fixed terminal and the other blade inserted into the discrete terminal, using the plug-in fuse to electrically connect the discrete terminal to the bus-bar. The fuse/bus-bar assembly is made of two materials with different thicknesses. The bus-bar is made of an elongated metal plate and the fixed terminal is made of a highly conductive metal strip. This solution has medium power circuits and SL and HW technologies. However, it does not anticipate or even suggest that the circuits can be modular.

The U.S. Pat. No. 5,581,130 describes a circuit with removable modules, which are mounted on a flat base or support, said modules being connected at least electrically by coupling means, in such a way that the power supply system for the electrical devices of the vehicle is modular, without being linked to any particular type or model of vehicle. However, the proposed solution does not anticipate the use of the HW solution and neither primary distribution due to the absence of pre-fuse. In addition, U.S. Pat. No. 5,581,130 does not have protection against fluids and high temperature.

The U.S. Pat. No. 5,928,004 discloses an electrical connection box for an automotive vehicle with the purpose of reducing the size of the box, such as a junction block, and to enable the mounting of a compact integrated fuse therein. Internal circuits are arranged in a housing divided into lower casing and upper casing and separated into circuits of high, medium and low current. The high current circuits consist of a bus-bar, current wiring and terminal current circuits, and low current circuits of a flexible printed circuit (FPC). A fuse box into which a compact integrated fuse is mounted is disposed on the upper surface of the FPC. However, the U.S. Pat. No. 5,928,004 does not have a pre-fuse, that is, the module where the high-power circuits are separated.

OBJECTS OF THE INVENTION

A first object of the present invention is a hybrid power distribution central unit for vehicles, which incorporates different ways to connect the terminals of the electric/electronic cabling of a vehicle to the protection, switching elements and other components.

A second object of the present invention is a hybrid power distribution central unit for a vehicle of modular type, that is, capable of receiving and connecting one or more individual modules of different types and characteristics, whereas said modules are standardized and dimensioned in such a way that they can be connected to any hybrid power unit so produced.

A third object of the present invention is a hybrid power distribution central unit of modular type, the external design of which allowing the said hybrid power central unit to be used on several vehicle lines, said lines intended for locally different consumer markets. Inside the hybrid power distribution central unit can be coupled one or more individual modules, the selection of said modules being made according to the particular characteristics of the local consumer market and the functionalities required by the vehicles.

SUMMARY OF THE INVENTION

These and other objects are achieved from a hybrid power distribution central unit for vehicles according to the present invention, which is modular and comprises therein a plurality of S1-$n$ seats with equivalent sizes and it being capable to receive at least one of a plurality of functional modules of different types in respective one or more adjacent seats. More particularly, said hybrid power distribution central unit comprises a housing (box) defined by a base, side walls, front and rear walls and cover, internally defining a plurality of seats (S1-$n$) for coupling functional modules of specific types. The front wall of the housing (box) comprises a lowered region in order to receive a power supply module for all the functional modules coupled in the respective seats (S1-$n$) of the housing (box).

Said functional modules have HW, or PCB, or SL typology and can be selected depending on the controls and functionalities of the vehicle. From the dimensional point of view, any one of the functional modules has a width equivalent to a multiple of the seat widths (S1-$n$).

In addition, each of the front and rear walls of the housing (box) has internally a pair of grooves by seat (S1-$n$), each groove defining a longitudinal opening and having a L-shaped cross-section, and each pair of grooves being capable of receiving a respective pair of couplings of any of the functional modules, each said coupling being projecting from the body of the respective functional module and having a L-shape. On the outside of the housing (box) front wall, directly below the lowered region, there are provided couplings in order to receive, by coupling, the power supply module, and such a power supply module has an inverted L-shape and comprises: a busbar in the form of a metal plate, on which the electrical contacts are fixed, said electrical contacts having respective holes capable of coupling themselves, by fitting and threading to the electrical coupling pins for the contacts of the functional modules; a support structure shaped so as to receive, by fitting, the power supply pins; projections of the structure disposed on the sides of the power supply module and intended to receive and couple a lower closing and busbar supporting cover. Finally, the electrical contacts, which connect the busbar to the pins, comprise a pre-fuse.

Having in mind this premise, it was verified the feasibility of using hybrid and modular power distribution central units, capable of bringing together the most favorable characteristics of each system and eliminating, reversing or mitigating the unfavorable characteristics, in view of the needs of each application design. Therefore, the modular solution presents greater flexibility regarding to the grouping and content configurations to be offered, thus reducing development time and costs. The solution also allows a greater number of alternatives regarding the distribution of space and, because of its modular nature, allows that designs can be developed taking into account the saturation of the technology over time, providing an adequate number of functions for each typology and effectively reducing the risk of requiring for addition of power units over time, which incur high cabling costs and may be unfeasible because of space.

BRIEF DESCRIPTION OF THE FIGURES

The object of the present invention will be better understood in the light of the following detailed description of a preferred non-limiting embodiment thereof which is made with reference to the attached drawings, taken only by way of illustration, in which.

DESCRIPTION OF A PREFERRED EMBODIMENT OF THE INVENTION

Figure 1A:
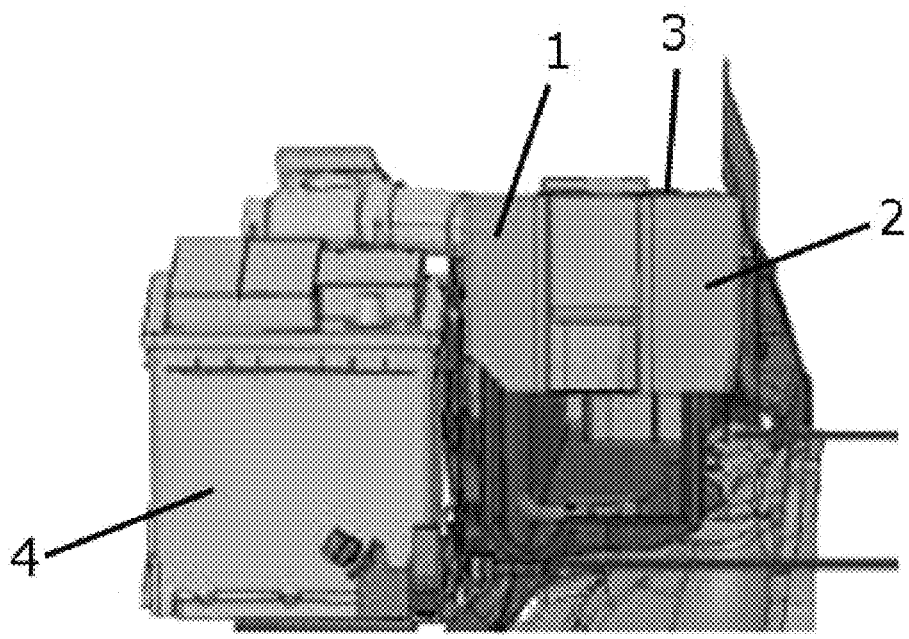
FIGS. 1A, 1B and 1C are partial views of the engine compartment of a vehicle in which the hybrid power distribution central unit according to the present invention is arranged, respectively, in front, top and cross-sectional views.
Figure 1B:
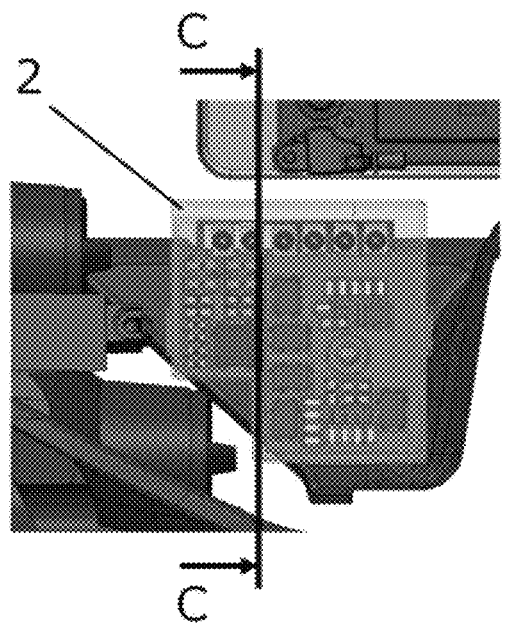
Figure 1C:
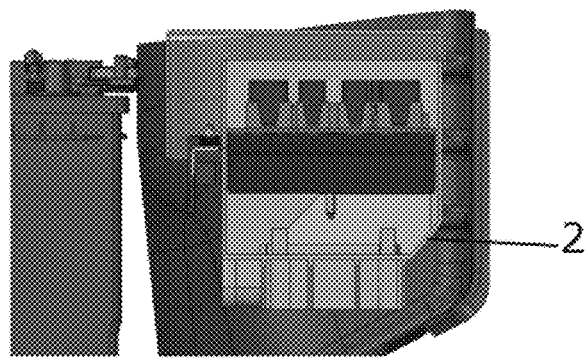

According to the attached figures, with 1 there is generally indicated a hybrid power distribution central unit for vehicles according to the present invention. In particular, said hybrid power distribution central unit 1 is defined by a housing (box) 2, provided with a cover 3, which has inside it a plurality of functional modules 12, 13 and 14 and power supply module 11 (see FIG. 4), each having a particular and specific type.

More particularly, said housing (box) 2 has a specific shape and it is pre-designed so as to be able to receive a certain amount of modules 11, 12, 13 and 14, each having a specific size and functional type.

More particularly, said housing (box) 2 comprises a base 21 from which pairs of front and rear walls 22 and side walls 23, respectively opposite each other, are designed. In the inner part of the front and rear walls 22 of the housing (box) there are further provided preferably L-cross section grooves 24. In addition, said grooves 24 are made in pairs, being the distance between each groove 24 of a pair of grooves is always constant and less than the width of any one of the functional modules 12-14. On the other hand, any one of the functional modules 12-14 also has respective L-shaped cross-sectional couplings 25, also in pairs, in order to allow the insertion of a pair of couplings 25 into a pair of housing (box) 2 inner grooves 24.

Figure 2:
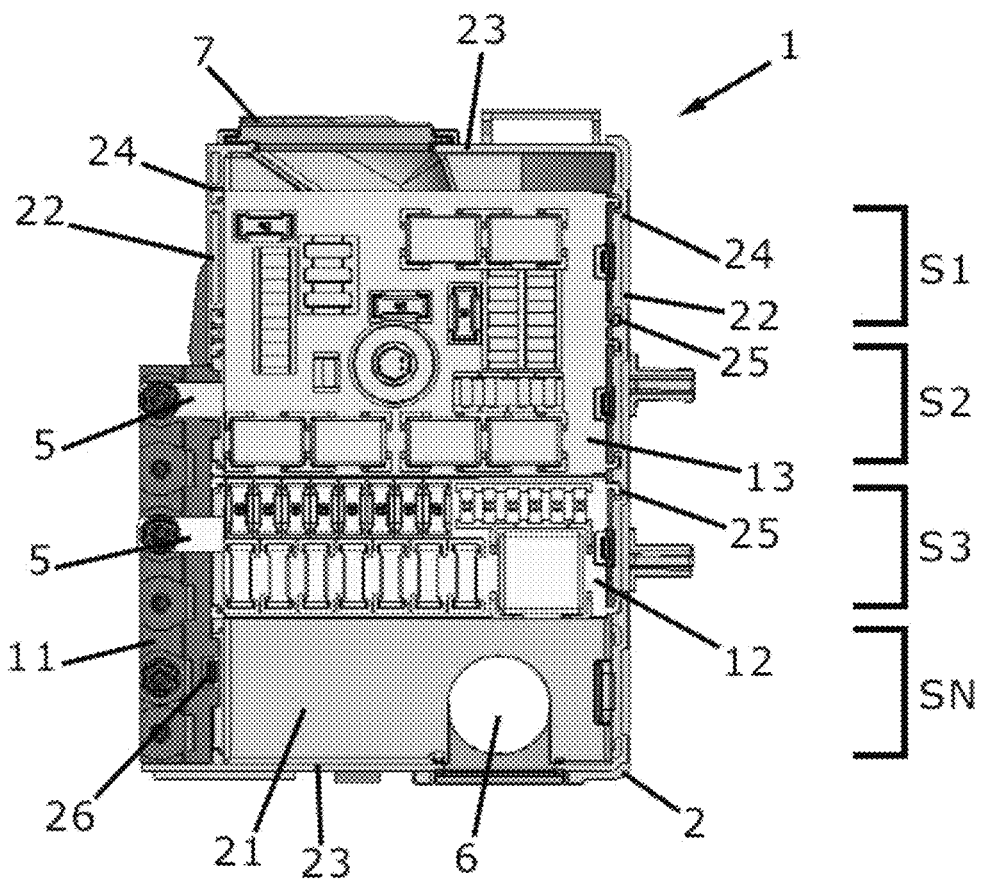
FIG. 2 is a top elevational view of the hybrid power distribution central unit of FIG. 1, with the cover removed in order to illustrate the modules layout.

As can be seen in FIG. 2, the HW technology functional module 12 has a minimum width. In this case, said module 12 has only a pair of couplings 25 which enter into the respective internal grooves 24 of the housing (box) 2, thus occupying only one seat S3 of said housing (box) 2. The PCB technology module 13 has a width which is twice the width of the module 12 and thus has two pairs of couplings 25, which enter into two pairs of grooves 24, i.e., occupying the corresponding to two adjacent seats (for example S1 and S2) of the housing (box) 2. In the same sense, despite not being illustrated, a possible module having a width corresponding to three times the width of the module 12 of FIG. 2 would have three pairs of couplings 25 and would thus occupy the space corresponding to three seats (for example, S1-3) of the housing (box) 2.

It should also be noted that in the modularization concept, regardless of the shape and/or dimensions of the housing (box) 2, the distance between the front and rear walls 22 is constant and corresponds to the length of any one of the modules 12-14, while the distance between the side walls 23 varies according to the defined capacity of seats S1-n of the housing (box) 2. In addition, the coupling of any one of the functional modules 12-14 inside the housing (box) 2 ensures that the housing (box) 2 has an empty space between any one of the installed modules and the bottom of the housing (box) 2 itself. Such space is intended for the installation of respective connectors, for example, for the functional modules 12 (header), as well as for the installation of electric cables and wires that electrically connect each electrical element of the modules (fuse, actuator, relay, etc.) to the vehicle's electrical or electronic device (headlight, air conditioner, windshield wiper, etc.). In addition, the housing (box) 2 further has apertures 6 and 7 to pass through them the electrical harnesses which will be connected to the respective modules 11-14.

Said front wall 22 further has a lowered region (see FIG. 3) and is provided with front couplings 26 in order to couple a power supply module 11 to said wall 22. In particular, said power supply module 11 has an inverted L section shape, from which the equipotential pins 27 are projected (see FIG. 5), into which the contacts 5 of the functional modules 12-14 are inserted, so as to supply electrical energy from the battery 4 (see FIG. 1A) to said functional modules.

Figure 5:
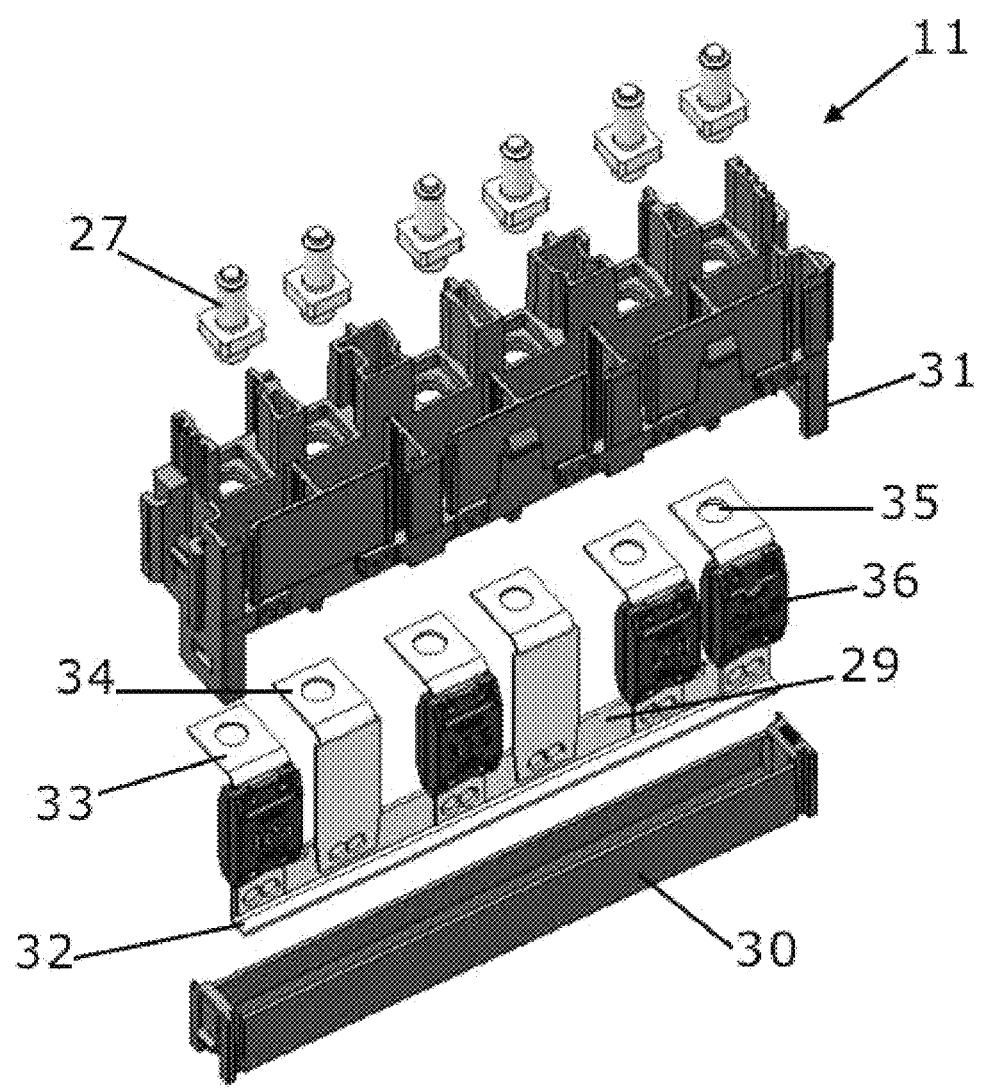
FIG. 5 shows an exploded perspective view of a power supply module.

As can be seen in FIG. 5, said power supply module 11 comprises a support structure 28 shaped so as to receive, by fitting, the power supply busbar 29. On the sides of the module 11 are projections 31 which are intended to receive and couple the lower closing and busbar 29 supporting cover 30. In addition, said busbar 29 is defined by a metal plate 32, on which are fixed, and preferably riveted, the electrical contacts 33, 34. Said electrical contacts 33, 34 also have respective holes 35 able to couple themselves, by fitting and threading, to the electrical coupling pins 27 for the contacts 5 of the functional modules 12-14. Obviously, as it is clear to any skilled person in the art, the number of pins 5 and, therefore, the size of a power supply module 11 depends on the number of functional modules to be electrically fed, i.e. the size of housing (box) 2 and the amount of seats allotted in the housing (box) 2.

More particularly, on the body of the metal plate 32, electrical contacts 34 as well as electrical contacts 33, all them in the form of folded blades, are fixed by riveting but intermediated by pre-fuses 36. As a result, the functional modules 12-14 to be electrically fed by connection to one of said electrical contacts 33 are electrically protected by means of the respective pre-fuse 36. On the other hand, the electrical contacts 34, which do not have the pre-fuses 36, can be reserved for power supply to any functional modules 12-14 which do not require this electrical protection, or may be used as extra electrical outputs or as an electric power supply for the busbar 29 of the power supply module 11. For example, an electrical contact 33 may connect, by means of its respective pin 27, a HW 12 functional module in which only electrical fuses (connected to headlamps, flashlights, etc.) are arranged thus making the presence of a pre-fuse unnecessary. On the other hand, an electrical contact 33, provided with a pre-fuse 36, may be intended for supplying power to a functional module 14, of the PCB type, in which more sensitive electronic or electrical components, such as processors, sensors and the like are embedded.

Figure 4:
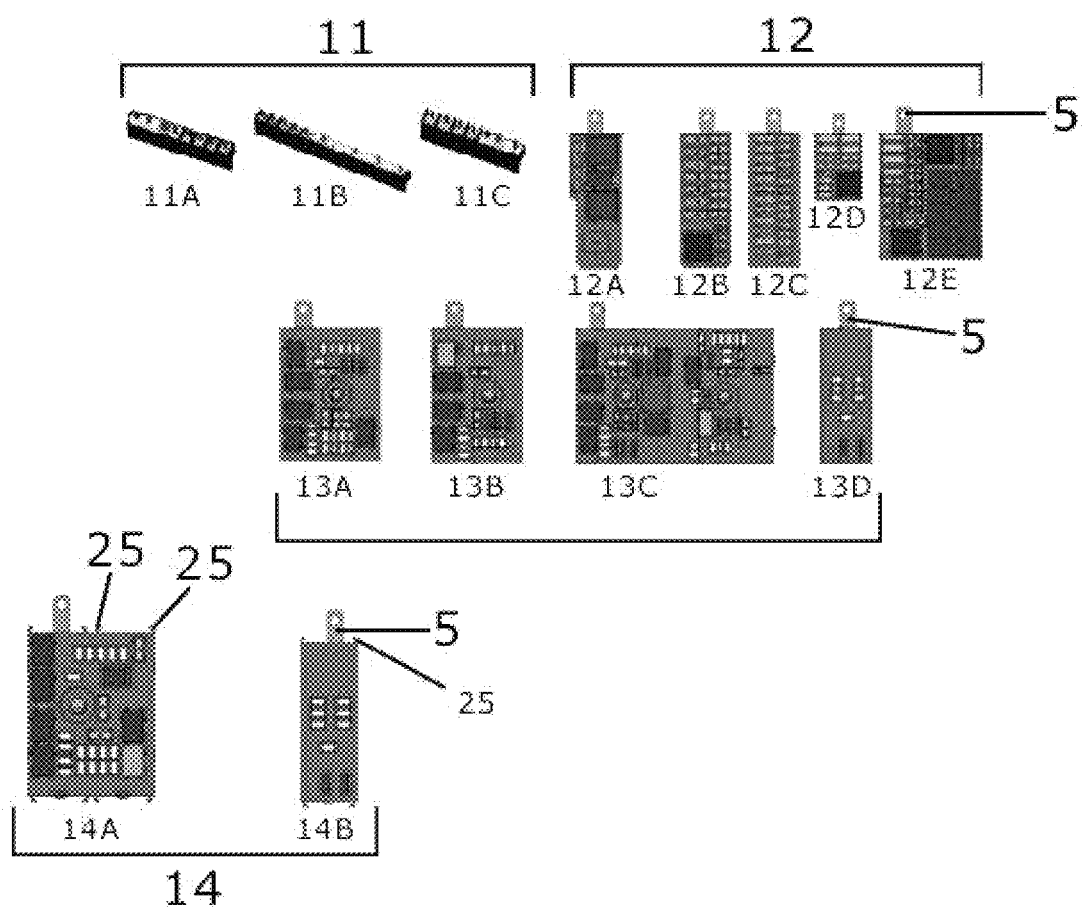
FIG. 4 shows an exemplary catalog of functional and power supply modules designed to enable various application configurations.

With respect to said modules, examples of which are illustrated in FIG. 4, these can be functionally grouped, for example, in power supply modules (11A-C) and in the mentioned functional modules such as HW modules (12A-E), PCB modules (13A-D) and SL modules (14A-B). Each of these modules operates, from a functional point of view, in order to perform the functions related to each of its components, despite being the forms of assembly and connection specific and linked to the specific typology of the module in which these components are assembled. In addition, each of said modules, in particular, has a specific and predefined size. Thus, for example, in the illustrative modules shown in FIG. 4, the overall dimension, in particular the width of modules HW 12E, PCB 13A or SL 14A, is twice the width of modules HW 12A, PCB 13D or SL 14B but is half the size of the module 13C. Moreover, the PCB module 13D has similar size to said HW modules 12A, 12B or 12C and approximately half the size of the modules 13A and 13B.

Such a feature is particularly interesting and important in the general concept of the present invention, since it allows modules of distinct types to be interchangeable with each other.

A specific example of this concept is illustrated in FIG. 2, wherein the housing (box) 2 has a first larger module installed, for example a PCB module 13A or 13B. Adjacent thereto is disposed a smaller module, for example a HW module 12A, 12B or 12C. In addition to the above-mentioned modules, said housing (box) 2 further shows an unoccupied seat Sn which, according to the main feature of the invention, can be filled with a module having the size compatible with this seat, regardless of the typology thereof. In addition, and depending on the needs of the vehicle in which said hybrid power distribution central unit 1 is installed, the aforementioned first module (PCB) could be replaced by a HW module, such as the module 12E.

In order to guarantee the interchangeability of its components, regardless of the type of each one of these components, the housing (box) 2 further has an electrical power busbar, defined by one of the power supply modules 11, in order to receive the contacts 5 provided in each one of the modules 12, 13 or 14. Therefore, it is possible to provide a centralized power supply from the battery 4 to any of the modules installed in the housing (box) 2, which increases said interchangeability of the modules 12-14 in each one of the defined seats S1-n. In order to do so, each one of the interchangeable modules must be designed so as to have the respective contact 5 in a predefined position.

Finally, said housing (box) 2 further has apertures 6, 7 in order to receive the electrical wiring assigned to each of the modules that will be positioned within the housing (box) 2 of the hybrid power distribution central unit 1. In particular, said openings may be formed in one of the side walls 23 of the housing (box) 2 (aperture 7) or may be apertures formed in the base 21 of the housing (box) 2 (aperture 6). As a particularly interesting feature of the present invention, electrical wiring that electrically interconnects the hybrid power distribution central unit 1 to other vehicle's electric and electronic devices (lights, air conditioning, windshield wiper, sensors, etc.) does not require any kind of change, except the connection terminals of the various electrical wiring to the modules, which terminals must comply with the standardized connection form of the module type.

Figure 3:
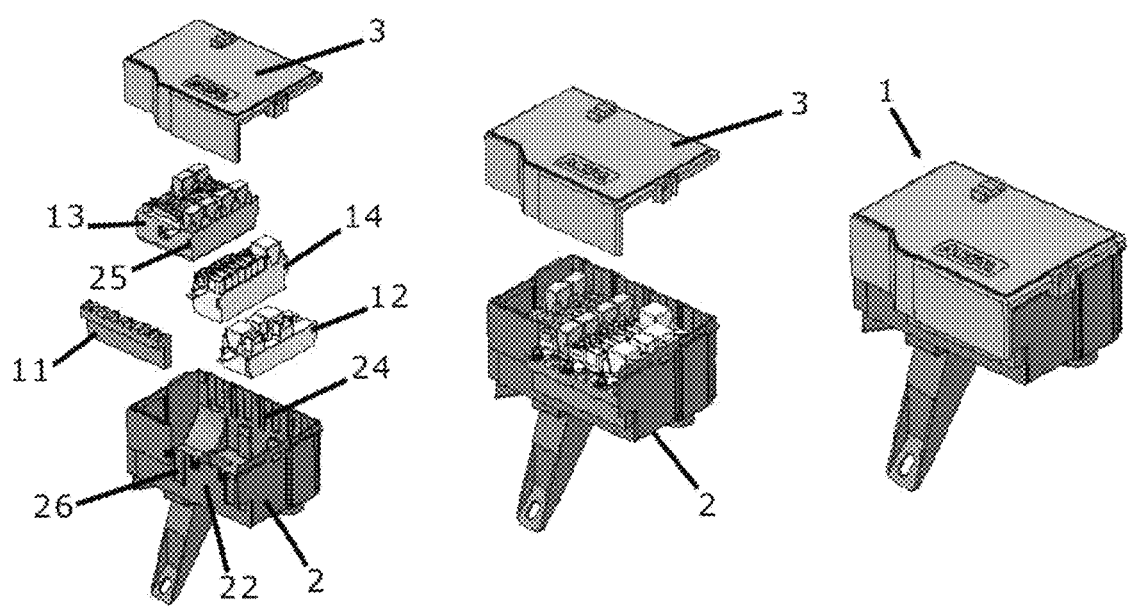
FIG. 3 illustrates a schematic assembly sequence of the hybrid power distribution central unit.

FIG. 3 is a schematic representation of the modules assembly inside the housing (box) 2 of the hybrid power distribution central unit 1. Thus, as soon as the functional needs of the hybrid power distribution central unit 1 (switching, current control, etc.) are defined, which are a function of the equipment and accessories installed in the vehicles, as a next step the more appropriate housing (box) 2 has to be choice/designed. It should be noted that, for a vehicle line, the functional needs for the most basic model and the most complete model must be taken into account. In other words, in order to determine the size and characteristics of the housing (box) 2, this should be made in function of all possible required combinations of modules/typology so as the hybrid power distribution central unit 1 to appropriately act in an appropriate way whatever is the specific vehicle in a possible vehicle line.

After these require features are defined, the housing (box) 2 is designed, the assembly of which initially comprises the installation of power supply to the modules, the HW modules connectors and the pre-fuse box. Thereafter, each of the functional modules assigned to a particular vehicle, on an assembly line, are sequentially coupled to the seats previously defined and connected. Finally, the cover 3 and any further cover element are assembled, completing the hybrid power distribution central unit 1.

As can be observed, the modularization of the hybrid power distribution central unit 1 shows itself in a highly positive way, since it allows being composed from individual modules, each one module being formed and defined by its own typology. As a result, each one of the functions of the hybrid power distribution central unit 1 can be performed through a respective module which is most appropriate in accordance with the particular characteristics thereof. In addition, and since the various modules are interchangeable in a previously defined seat or space, it is possible to adapt a particular housing (box) 2 in order to particularly use in a line of vehicles, whatever the control needs each vehicle has, depending on its accessories and embedded devices.

As a result, in addition to the time gained with the assembling of the hybrid power distribution central unit 1, the solution described in the present invention still reveals substantial gains in the steps related to the design of the vehicle engine compartment and the electrical grid of a vehicle line.

Finally, due to its modularization, the said hybrid power distribution central unit 1 can be configured through a previous catalog of components that, in a planned way, allows groupings of modules of different types and characteristics, making the solution, in addition of hybrid and modular, expandable and flexible. In addition, the hybrid power distribution central unit of the present invention is composed of functional modules that allow, as far as is required, the quantity of switching elements (Relays) and protection elements (Fuses) interconnected by cables or stamped metal busbars (Bus-Bars) that ensure the highest level of electrical protection and the least degree of the circuits complexity. As a result of these characteristics, it is possible, from a basic design of the hybrid power distribution central unit housing (box), to adapt its content and functionalities to several vehicle lines, even when such vehicles or vehicle lines are produced in different industrial plants and intended for different consumers and with particular regional requirements. From the design point of view, such a characteristic allows a great saving in terms of customization and regionalization of vehicle lines.

The invention claimed is:

1. A hybrid power distribution central unit (HPDC) for vehicles, the HPDC comprising:
   a plurality of seats located inside the hybrid power distribution central unit of equivalent dimensions and capable of receiving at least one of a plurality of functional modules of different types in respective one or more adjacent seats,
   wherein the HPDC comprises a housing box defined by a base, side walls, front and rear walls, and cover, thereby defining internally the plurality of seats for coupling the functional modules of different types, wherein the front wall of the housing box comprises a lowered and receivable region in order to receive a power supply module configured to electrically feed all the functional modules coupled in respective seats of the housing box, wherein each of the front and rear walls of the housing box has internally a pair of grooves by each seat, each groove defining a longitudinal hollow opening and having a L-shaped cross-section, and each pair of grooves being able to receive a respective pair of couplings of any one of the functional modules, each of said couplings projecting itself from the body of the respective functional module and having an L-shaped form, wherein, on the outside of the front wall of the housing box, directly below the lowered region, there are provided couplings in order to receive, by coupling, the power supply module, wherein said power supply module has an inverted L-shape form and comprises:
- a busbar, in the form of a metal plate, on which electrical contacts are fixed, said electrical contacts having respective holes capable of coupling themselves, by fitting and threading, to electrical coupling pins for contacts of the functional modules;
- a support structure that has a shape so as to receive, by fitting, the electrical coupling pins;
- projections of the structure disposed on the sides of the power supply module and intended to receive and couple a lower closing and busbar supporting cover.

2. The hybrid power distribution central unit, according to claim 1, wherein said functional modules are hard-wired (HW) or a printed circuit board (PCB), or a stamped leadframe (SL) type.

3. The hybrid power distribution central unit, according to claim 1, wherein said functional modules are selected in function of the controls and functionalities of the vehicle.

4. The hybrid power distribution central unit, according to claim 1, wherein any one of the functional modules has a width equivalent to a multiple of the seats width.

5. The hybrid power distribution central unit according to claim 1, wherein the electrical contacts interconnect the busbar to the pins and comprise a pre-fuse.

6. A vehicle comprising the hybrid power distribution central unit according claim 1.

7. A hybrid power distribution central unit (HPDC) for vehicles, the HPDC comprising:
a plurality of seats located inside the hybrid power distribution central unit of equivalent dimensions and capable of receiving at least one of a plurality of functional modules of different types in respective one or more adjacent seats, wherein the HPDC comprises a housing box defined by a base, side walls, front and rear walls, and cover, thereby defining internally the plurality of seats for coupling the functional modules of different types, wherein the front wall of the housing box comprises a lowered and receivable region in order to receive a power supply module configured to electrically feed all the functional modules coupled in respective seats of the housing box, wherein each of the front and rear walls of the housing box has internally a pair of grooves by each seat, each groove defining a longitudinal hollow opening and having a L-shaped cross-section, and each pair of grooves being able to receive a respective pair of couplings of any one of the functional modules, each of said couplings projecting itself from the body of the respective functional module and having an L-shaped form.

8. A vehicle comprising the hybrid power distribution central unit according claim 7.

* * * * *